Figure 1:
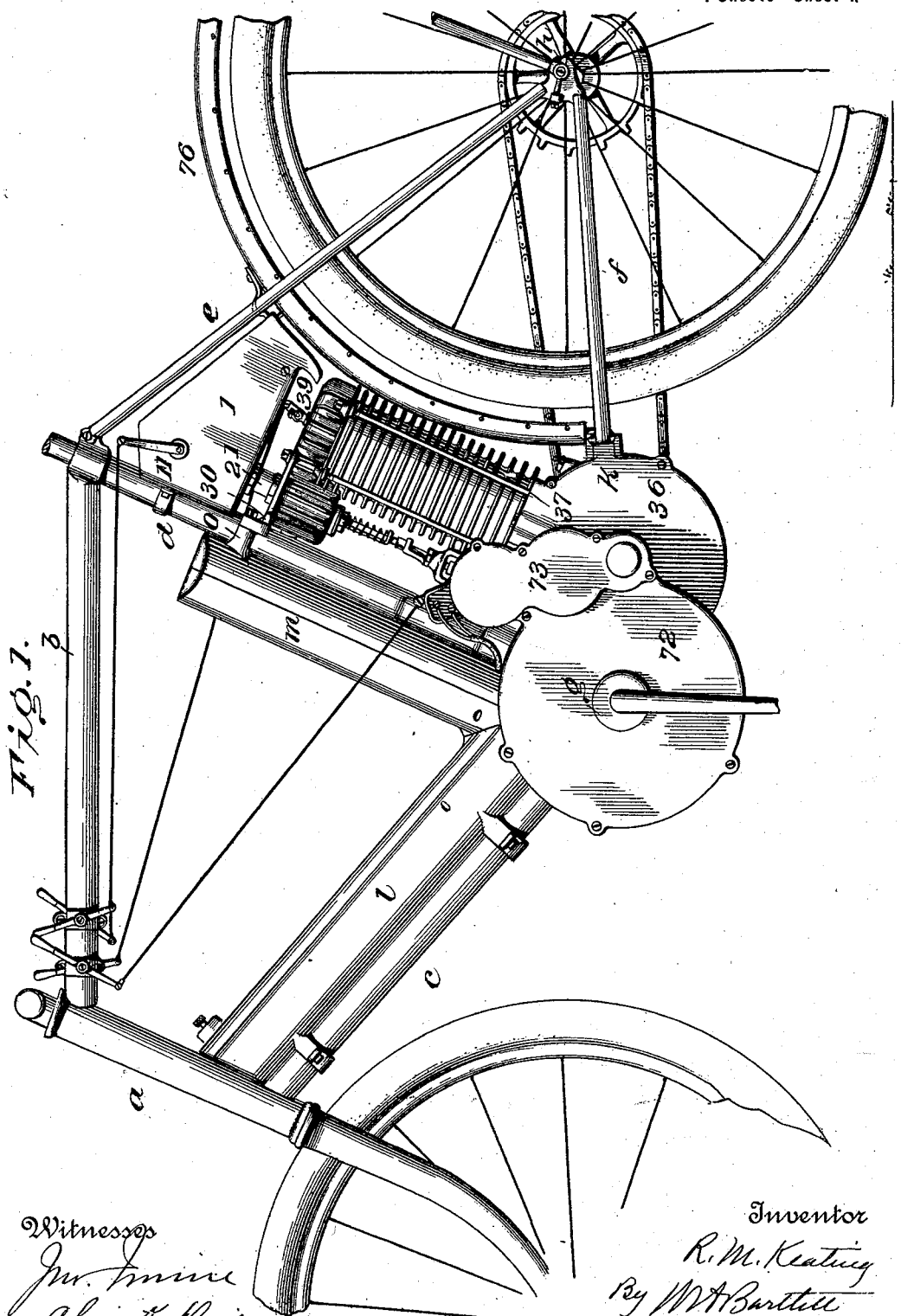

No. 695,562. Patented Mar. 18, 1902.
R. M. KEATING.
BICYCLE MOTOR.
(Application filed Dec. 8, 1900.)
(No Model.) 4 Sheets—Sheet 1.

Witnesses
Inventor
R. M. Keating
By W. H. Bartlett
Attorney

No. 695,562. Patented Mar. 18, 1902.
R. M. KEATING.
BICYCLE MOTOR.
(Application filed Dec. 8, 1900.)
(No Model.) 4 Sheets—Sheet 2.
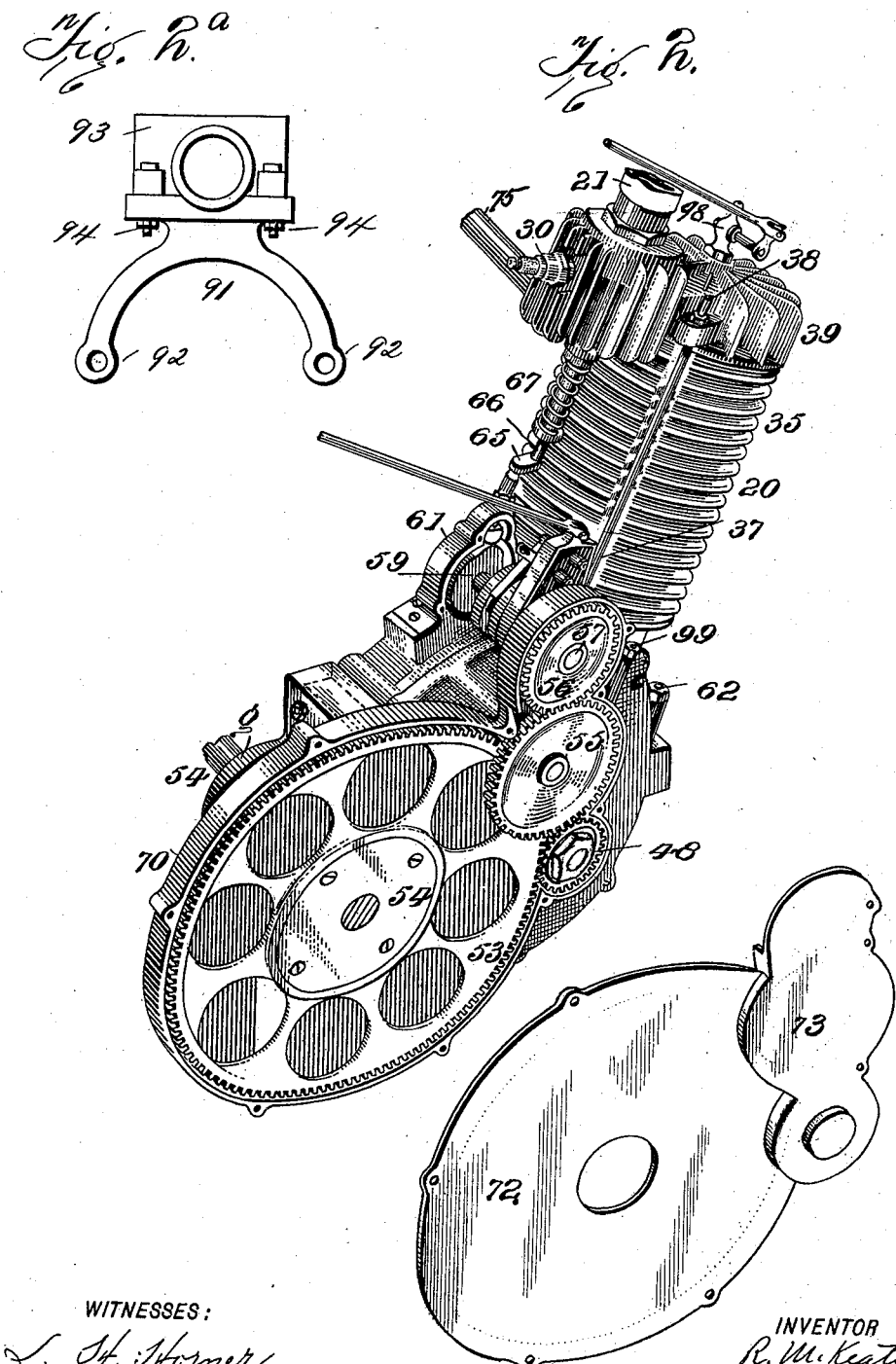
WITNESSES:
L. H. Horner.
Chas. K. Davies.
INVENTOR
R. M. Keating
BY W. H. Bartlett.
ATTORNEY No. 695,562. Patented Mar. 18, 1902.
R. M. KEATING.
BICYCLE MOTOR.
(Application filed Dec. 8, 1900.)
(No Model.) 4 Sheets—Sheet 3.
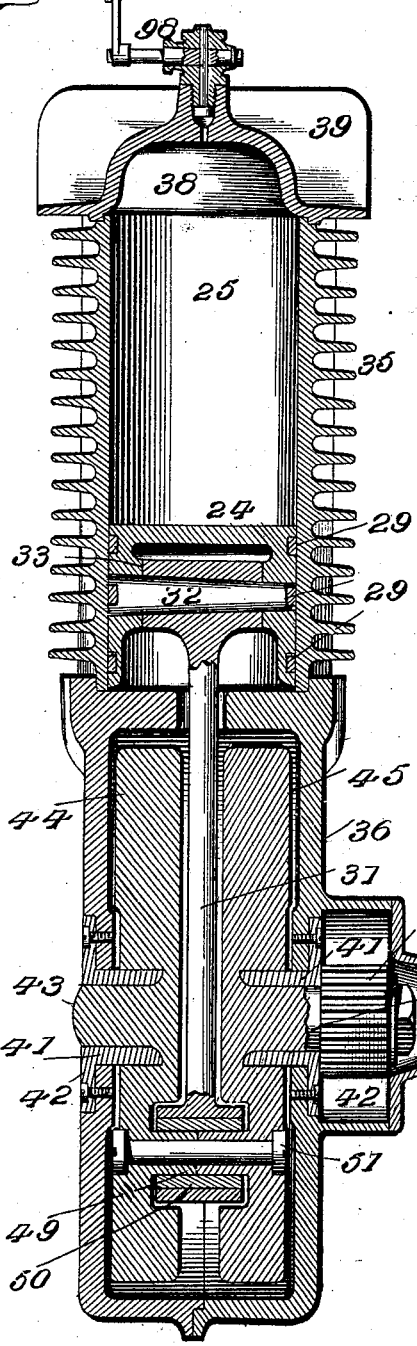
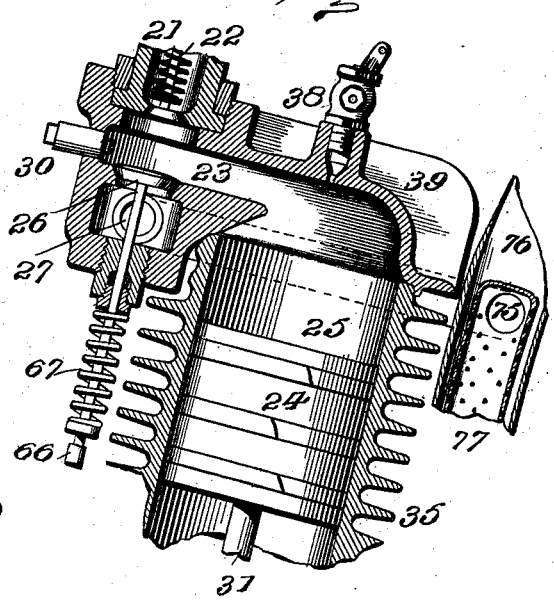
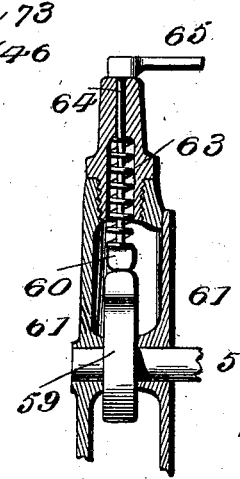

No. 695,562. Patented Mar. 18, 1902.
R. M. KEATING.
BICYCLE MOTOR.
(Application filed Dec. 8, 1900.)
(No Model.) 4 Sheets—Sheet 4.
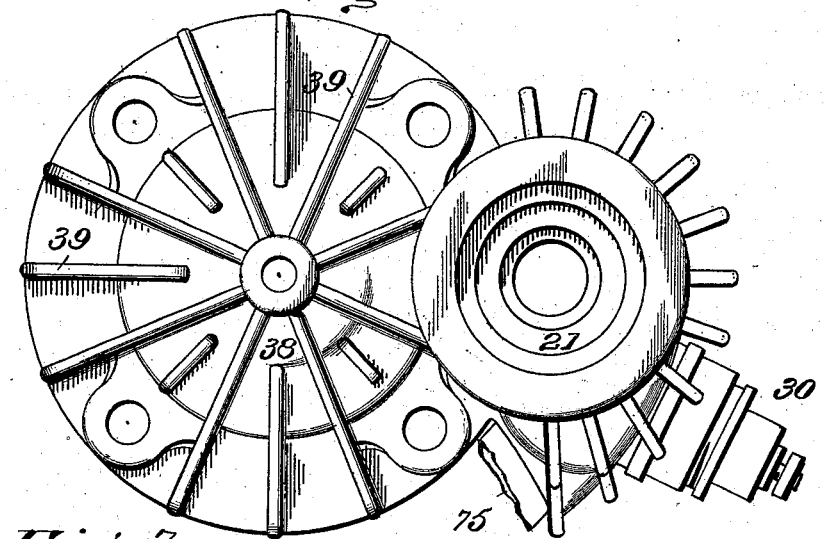
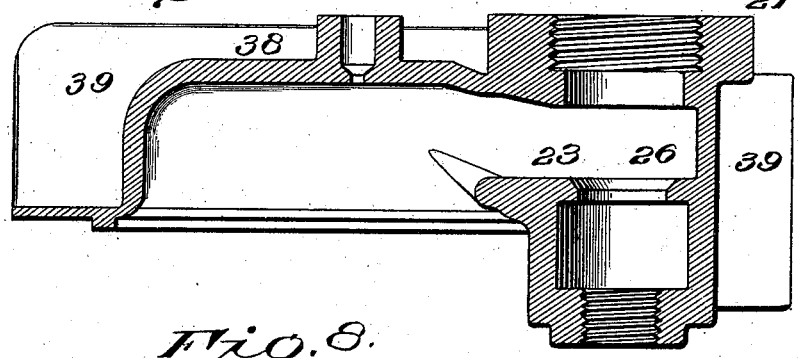
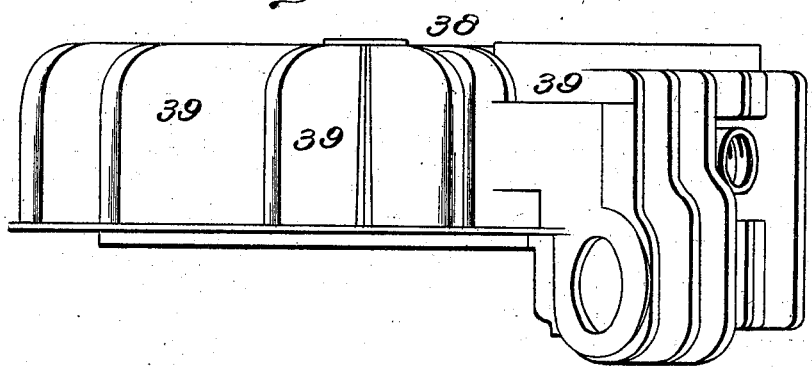
WITNESSES
Jno. Imrie
Chas. K. Davies
INVENTOR
R. M. Keating
BY W. H. Bartlett
ATTORNEY

UNITED STATES PATENT OFFICE.

ROBERT M. KEATING, OF MIDDLETOWN, CONNECTICUT, ASSIGNOR TO THE R. M. KEATING MOTOR COMPANY, OF PORTLAND, MAINE, A CORPORATION OF MAINE.

BICYCLE-MOTOR.

SPECIFICATION forming part of Letters Patent No. 695,562, dated March 18, 1902.

Application filed December 8, 1900. Serial No. 39,174. (No model.)

*To all whom it may concern:*

Be it known that I, ROBERT M. KEATING, residing at Middletown, in the county of Middlesex and State of Connecticut, have invented certain new and useful Improvements in Bicycle-Motors, of which the following is a specification, reference being had therein to the accompanying drawings.

This invention relates to engines for motor-bicycles, and especially gasolene-engines for bicycles.

The object of the invention is to produce a bicycle or vehicle motor constructed with special view to lightness and compactness in a diamond-frame bicycle; also, to arrange the separate parts of the engine with special relation to their location in the frame of a bicycle or vehicle and to improve the engine as to compactness and accessibility in the frame of a vehicle; also, to provide for the utilization of the waste heat of the engine as far as may be in the vaporization of the gasolene by which the engine is driven and in various ways improve the engine for this particular purpose.

Figure 1 is a broken side elevation of a bicycle with my improved motor and connections attached. Fig. 2ª is a plan of the engine-bracket. Fig. 2 is a perspective view of the engine detached and with the cover removed from the casing and gearing, showing some connections in part. Fig. 3 is a central longitudinal section of the engine-cylinder, piston, gears, and casing. Fig. 4 is a broken detail section of expansion-chamber and valves. Fig. 5 is a broken detail section of cam and attachments for lifting exhaust-valve. Fig. 6 is a top plan view of the motor-cylinder and explosion-chamber. Fig. 7 is an enlarged sectional detail of explosion-chamber. Fig. 8 is a detail elevation of cylinder-cover and explosion-chamber, and Fig. 9 a cross-section of the muffler.

As the engine is constructed with special relation to its location in the frame of a bicycle, I have shown such parts of the bicycle as are necessary to give the correct idea of the engine construction.

Let $a$ indicate the front or steering head of a bicycle-frame. The top bar $b$ and the front bar $c$ are connected to the steering-head in any usual way. The seat-post $d$ connects with the top bar $b$ and with the pedal-bearing $g$ in usual manner, except that the hanger for the pedals is connected to the motor-casing and adapts it to coöperate with the motor, as will be explained. The rear top bars $e$ connect the upper end of the seat-post with the rear hub-bearing $h$, while the lower bars $f$ connect the hub-bearing to the casing $k$ of the motor, this casing being in turn connected to the hanger $g$. Thus a frame which is substantially in form like the well-known diamond frame is produced.

A tube or casing $l$ is connected to bar $c$ of the frame, and this case $l$ has a branch $m$, which lies in contact with upright bar $d$. The tube or casing $l\,m$ is divided longitudinally, so that the upper part may be removed without disturbing the electrical batteries in the interior of said casing. The batteries in this tube are connected to the sparking device of the engine.

By reason of rapid expansion of the gasolene in the tank of some engines of this character or for some other reason the gasolene often becomes very cold and does not vaporize fast enough to supply the engine. To overcome this objection, I place my tank above the engine and draw hot air from close to the engine through a passage in the tank, and the explosive mixture is made from gasolene-vapor and heated air, as will be explained.

The gasolene-tank 1 is located directly over the engine 20 and both are attached to the seat-post $d$. The tank 1 is under the seat and receives the heat of the engine on its lower surface 2.

A valve-chamber 21 receives the vapor from the gasolene-tank and conducts it to the explosion-chamber 23 of the engine. A check-valve 22 of usual construction prevents backflow of gas or flame from the explosion-chamber to the mixer. This valve is opened by the suction of the piston in the cylinder and held closed when there is no suction by pressure within the cylinder, the usual spring aiding the closure.

The engine is what is known as a "four-cycle" engine—that is, the downstroke of the piston 24 in cylinder 25 draws or sucks vapor from the valve-chamber 21 into the explosion-chamber and cylinder. The upstroke of the piston 24 compresses this vapor into chamber 23. The sparker 30 acts at the proper time to ignite the vapor in chamber 23, and the explosion forces the piston 24 down in the cylinder 25, at the same time holding valve 22 closed. The piston is returned by the crank operation in usual manner, and the exhaust-valve 26 opens to let the spent gases of explosion escape by passage 27 to the muffler.

The sparker 30 is connected to the spark-coil and batteries by wires and operated to give a spark when the explosion should take place, and the time of the explosion can be determined by the position of the interrupter in usual manner. No further explanation is here deemed necessary, it being understood that a spark may be supplied to cause explosion at the proper time.

The piston 24 is a hollow cylinder closed at one end and having expansion-rings 29 of usual construction lying in grooves in the piston. The pitman 31 is held to the piston by a conical pin 32 passing through the hollow part of the piston and through a conical hole in the pitman. The ends of pins 32 are recessed, and one of the expansion-rings passes through the recesses in pin 32, thus holding the pin in place. The pitman swings on pin 32, having side bearings at 33 33 in the piston-head.

Cylinder 25 has the usual external radiation-ribs 35. The head 38, containing chamber 23, the cylinder 25, and fly-wheel chamber 36 are connected together by rods 37 in usual manner.

At starting, the exhaust-valve 98 is opened, to permit air to escape from the cylinder. When the explosion takes place flame will then flash from the valve, toward the gasolene-tank.

The fly-wheel casing 36, directly under the cylinder, is a short hollow cylindrical casing with its axis transverse to the axis of the cylinder 25. The casing 36 is made in two parts. Instead of the usual transverse shaft the fly-wheel casing has two short inwardly-projecting sleeves 41, of hardened steel or other hard material, removably attached to the casing. Each sleeve has a flange 42 set snugly in a recess in the outside of the casing. These sleeves 41 form journals for the fly-wheel. They enter annular grooves around the central bosses 43 46 of the fly-wheel sections 44 and 45, which sections are, in general form, two flat disks with projecting bosses, as will be explained.

The fly-wheel sections 44 and 45 are alike, except that the one, 45, has an elongated boss or shaft 46, and this projects from the side of the casing and bears the driving-pinion 48, which is firmly attached thereto.

Two inwardly-projecting pins 49 from the fly-wheel sections make contact at the center between the sections. A sleeve 50 covers these pins, and the pitman 31 surrounds this sleeve. The fly-wheel sections are assembled from opposite sides, and a bolt 51 secures the wheel-sections together. Then as the sleeves 41 both have external and internal bearings in the fly-wheel sections the connections are most substantial, the wearing-surfaces are large, and the device is very strong and compact. By giving to sleeve 41 both internal and external bearing-faces on the fly-wheel I am enabled to reduce the length of what is used as a substitute for the usual fly-wheel shaft, a very important consideration in engines for bicycles or small vehicles.

The driving-pinion 48 engages with the large reduction-gear 53, which is connected to shaft 54 and lies flat against the casing, so as to be easily covered. Thus the speed of pinion 48 is much reduced to shaft 54, said shaft 54 being the shaft from which the driving-wheel of the bicycle receives its power, and may be a pedal-shaft, as shown, or may drive the vehicle independently. Pinion 48 also engages intermediate pinion 55, which overlaps driving-pinion 53. The intermediate 55 drives pinion 56, which is attached to a cam-shaft 57, the latter extending transversely across the engine near the base of cylinder 25.

Cam-shaft 57 bears cam 59, and the gearing is so arranged that the cam 59 lifts tappet 60 with each rotation of the shaft 57, which occurs at every second rotation of the fly-wheel, and of course at each second upstroke of the engine.

The closed casing 36 can be filled with lubricant through a stoppered opening, and the fly-wheel and pitman will work in the casing. Enough of the lubricant will be carried up into the cylinder 25 to keep the same well lubricated. A stoppered opening 62 in casing 36 serves for the introduction of oil, and a relief or pop valve 99 permits air escape while retaining the lubricant. The casing 36 supports the bearing 61 of shaft 57.

Tappet 60 is pressed down by spring 63 and lifted by cam 59, as has been stated. Tappet 60 has a rod 64, which bears against finger 65, which finger strikes the spindle 66 of valve 22 when the tappet rises, thus lifting said valve. The valve is pressed down to closed position by spring 67 whenever the tappet permits the valve closure.

The gear 53 is covered at its rear side by a casing 70, connected to or integral with casing 36, thus attaching the engine strongly to the frame or to the pedal-bracket of the frame. The face of gear 53 is covered by a plate 72, attached by screws or otherwise. The gears 48 55 56 are inclosed in a recess in one of the sections of casing 36. The outside of these gears is covered by a plate 73, which may be attached permanently to plate 72. Access can then be had to gears 48 55 56 by releasing the detaining-screws and turning plate 72 to one side around the pedal-shaft or the hanger $g$, which passes through said plate 72 at the center thereof. When the covers are closed, the gears are protected against the admission of dust or foreign substances.

The exhaust from the engine passes out through opening 27 and along pipe 75 to the hollow mud-guard 76, which thus becomes the muffler. This guard 76 is in the arc of a circle conforming generally to the outline of the rear wheel and is attached at its front end to the bars *f* of the frame and is held above the rear wheel by suitable supports from the frame.

My machine is composed almost entirely of metal. The frame or casing 36 is preferably aluminium, and all parts are constructed with a view to lightness.

I have described my mechanism with special reference to its adaptation for use as a motor for bicycles; but I do not desire to restrict my claims on such parts as are capable of general application, as is believed to be the case in some instances.

The explosion-chamber 23 is inside the head of the engine in a single casting, which is bolted to the cylinder. The inlet check-valve and the exhaust-valve are located in a projection of the engine-head, and the same projection or overhang permits the application of the sparking device 30 at the end of the explosion-chamber.

The valve-moving mechanism is below the overhang, and the exhaust-valve has its axis parallel with the axis of the cylinder. The fly-wheel casing is extended to form a support for the cam-shaft bearings under the overhang of the engine-head. The engine and connections are thus of practically no greater thickness than the diameter of the piston-cylinder and radiating ribs. As a thin engine is important for bicycles, this reduction of thickness of the engine is deemed important.

The engine is supported on post *d* by a bracket 91, which has two perforated horns 92 to receive two of the rods 97, and has a clamp 93, which surrounds the seat-post and is clamped by screw-bolts 94.

What I claim is—

1. In a gasolene-engine as described, the combination of the engine-cylinder, the perforated, hollow piston moving in said cylinder, and having external grooves, the perforated pitman extending into said hollow piston and connected to the crank, a pin passing through the said piston and through the hole in the piston-rod, said pin having grooves in its outer ends, and a packing-ring lying in the grooves in the ends of the said pin and a groove in the pitman, and retained in said groove in the piston by the bearing of the cylinder thereon, substantially as described.

2. The combination, in an engine of the character described, of the engine-cylinder, the grooved hollow piston therein having a transverse passage; the pitman-rod entering said piston-head and a conical pin with grooved ends passing through said piston and pitman rod, a packing-ring lying in a groove in the piston and the grooves in the conical pin, and held in place by the cylinder, and the fly-wheel composed of two disks having inward projections and a surrounding sleeve, around which sleeve the pitman extends, all substantially as described.

3. In a gasolene-engine as described, and adapted for use with a motor-bicycle, the combination with the cylinder, of the fly-wheel casing directly under the cylinder, and consisting of two parts forming a drum with its axis transverse to the cylinder, said casing or drum having removable inwardly-projecting sleeves forming journals for the fly-wheel, the sectional fly-wheel journaled on said sleeves, and the piston having its pitman connected to pins on the fly-wheel sections, substantially as described.

4. The combination with the cylinder, of the fly-wheel casing in form of a drum directly under the cylinder, the fly-wheel and its driving connections within the casing, the driving-pinion in a housing outside the casing, a large reduction-gear lying flat against the casing and engaging said driving-pinion, and a gear on the pedal-shaft with which said reduction-gear engages.

5. In a gasolene-engine, the cylinder, piston, and a pitman connected to the piston, a fly-wheel consisting of two journaled disks with projecting pins, a sleeve surrounding such pins, and the pitman surrounding such sleeve, substantially as described.

6. In a gasolene-engine, the cylinder, piston, and a pitman connected to the piston, a fly-wheel consisting of two disks with projecting pins which are inclosed by the pitman, a tie-bolt extending through the two sections and pins of the fly-wheel and uniting them within the pitman, and journal-bearings for said fly-wheel, substantially as described.

7. In combination with the inclosing casing 36, the flanged sleeves 41 with their flanges secured in said casing, and the fly-wheel having annular grooves into which grooves said sleeves extend, substantially as described.

8. In a gasolene-engine, the fly-wheel and driving-pinion connected thereto, a large gear-wheel engaging said pinion and serving as a reduction-gear, the bicycle driving-shaft connected to said reduction-gear, an intermediate pinion also engaging the fly-wheel pinion, and a gear engaging said intermediate pinion and connected to the valve-controlling cam-shaft, all combined substantially as described.

9. In a gasolene-engine, the combination with the two retaining-rods 37, of a two-horned bracket through which said rods pass, and a clamp at the side of said bracket, said clamp composed of separable pieces adapted to embrace a cylinder or tube, substantially as described.

In testimony whereof I affix my signature in presence of two witnesses.

ROBERT M. KEATING.

Witnesses:
W. A. BARTLETT,
HARVEY T. WINFIELD.